Jan. 18, 1955

G. W. HOWELL 2,699,755

ANIMAL OPERATED CHICKEN FEEDER

Filed March 26, 1952

INVENTOR
George W. Howell

BY Mason, Fenwick & Lawrence
ATTORNEYS

Jan. 18, 1955  G. W. HOWELL  2,699,755
ANIMAL OPERATED CHICKEN FEEDER
Filed March 26, 1952  2 Sheets-Sheet 2
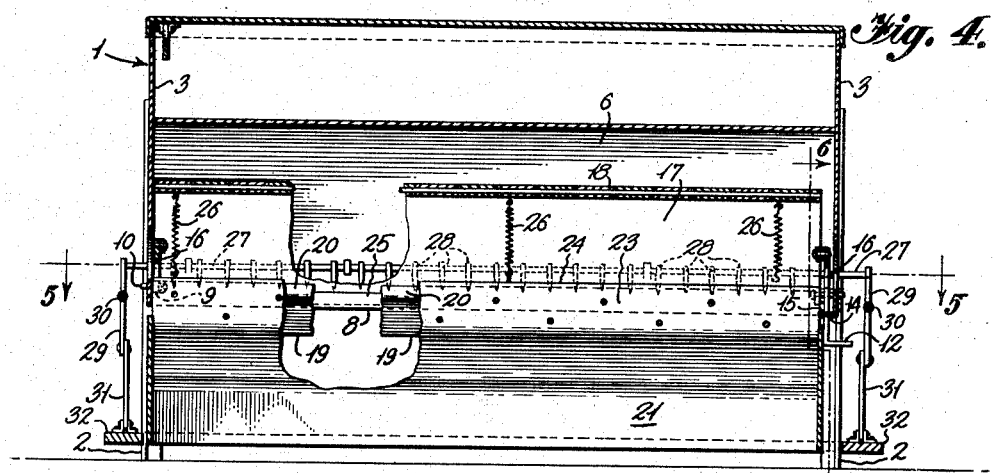
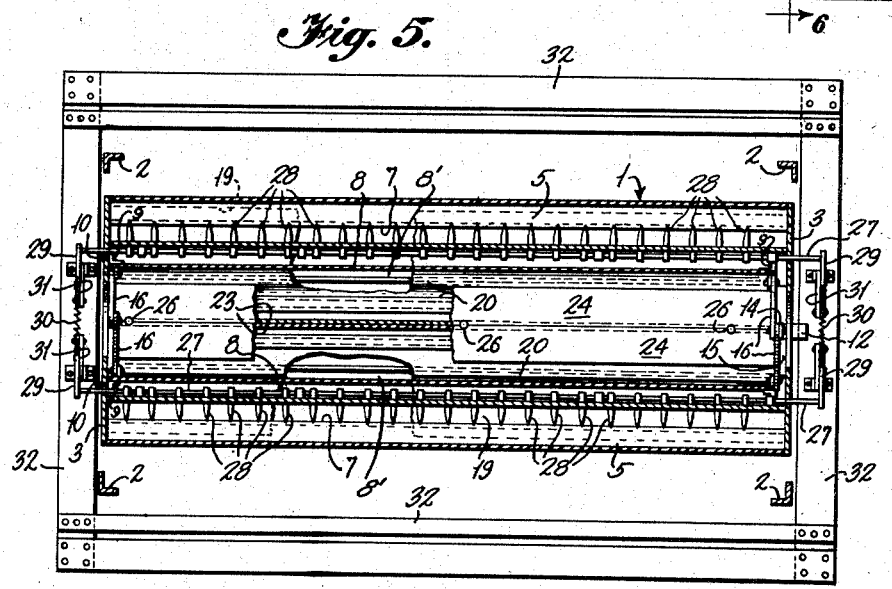
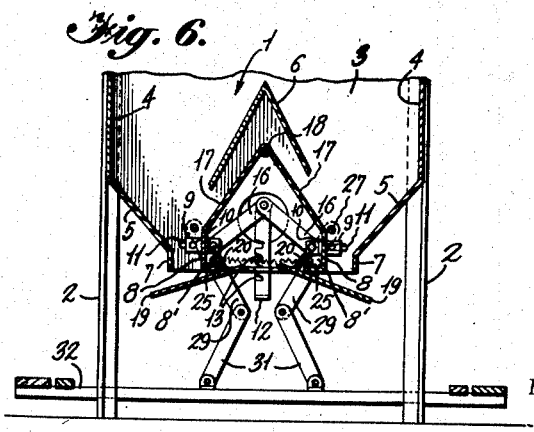
INVENTOR
George W. Howell
BY
ATTORNEYS

United States Patent Office 2,699,755
Patented Jan. 18, 1955

2,699,755

ANIMAL OPERATED CHICKEN FEEDER

George W. Howell, Orlando, Fla.

Application March 26, 1952, Serial No. 278,567

8 Claims. (Cl. 119—55)

This invention relates to poultry feeding devices, and more particularly to devices of this nature in which movement of the feed from the hopper to the feeding trays is automatically controlled.

Automatic feeders of many types are known, but they have many disadvantages. One of the common objections to known feeders is the waste of feed which is caused by the various arrangements of feeding control. Many of them are controlled by the weight of the fowl upon a treadle adjacent to the feed troughs. Fowl moving frequently on and off of the treadle cause the tray to be filled to overflowing, with much of the feed spilling upon the ground. Other principles have been used, but due to the arrangement the same results have occurred.

The object of the present invention is to provide an automatic poultry feeder in which the flow of feed is controlled solely by the weight of the feed within the troughs.

Another object of the invention is to provide a device of this nature in which provision is made for agitation or loosening of the feed in the hopper by the movement of the fowl to and from the feed troughs, so that the feed will remain in free-flowing condition.

A further object is to provide means for varying the exit throat of the hopper to accommodate feeds of different types and consistencies.

Other objects of the invention will become apparent from the following description of a practical embodiment thereof, when taken in conjunction with the drawings which accompany, and form a part of this specification.

In the drawings:

Fig. 4 is a vertical longitudinal section taken on the line 4—4 of Fig. 3;

Fig. 5 is a horizontal section taken on the line 5—5 of Fig. 4; and

Fig. 6 is a vertical, transverse section taken on the line 6—6 of Fig. 4.

Figure 1:
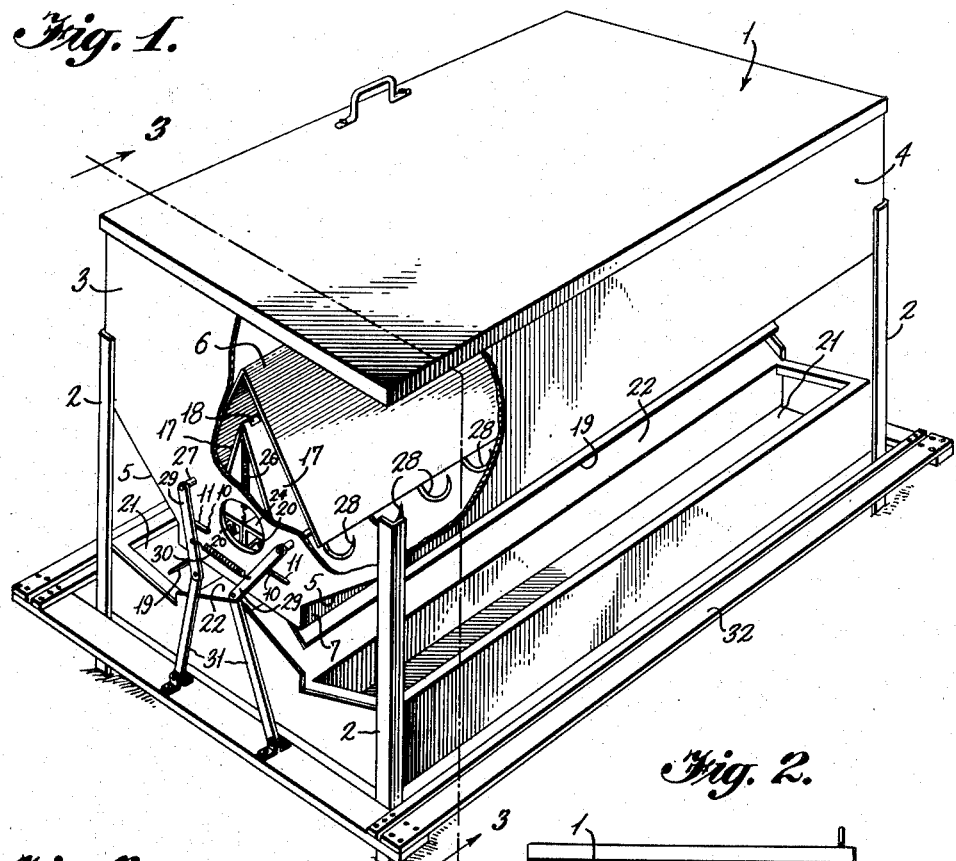
Figure 1 is a perspective view of a poultry feeder embodying the principles of the present invention.
Figure 2:
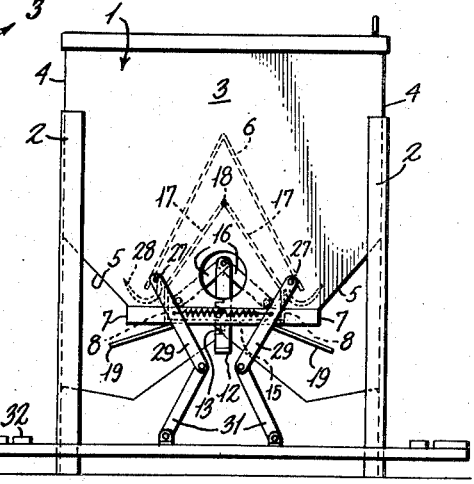
Fig. 2 is an end view of the feeder.
Figure 3:
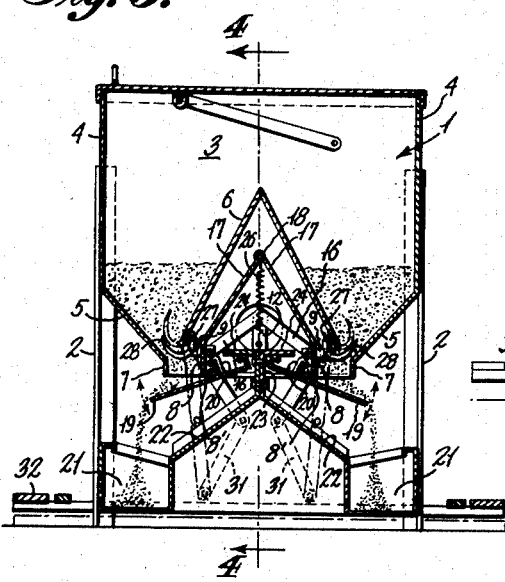
Fig. 3 is a vertical transverse section taken on the line 3—3 of Fig. 1.

Referring to the drawings in detail, the invention consists of a feed hopper, supported upon legs 2 attached to the corners of the hopper. The hopper is rectangular in horizontal cross-section and has vertical end walls 3. The upper portions 4 of the side walls are vertical and the lower portions 5 are inclined inwardly in the manner which is usual in hopper constructions. In order to provide dual outlets for the hopper, a separator or baffle 6 of inverted V-shape extends the length of the hopper and is rigidly secured to the end walls, and serves to divert the feed into two columns. The baffle extends across the major portion of the outlets to support the feed load.

The lower ends of the inclined sections 5 of the hopper are turned downwardly to form the outer vertical walls 7 of the dual outlets. These sides are spaced quite widely apart, and between them there are two channel members 8. The channels are horizontally movable and one vertical flange of each channel cooperates with one of the downturned outer sides of the hopper sides to form movable vertical walls 8' for the hopper outlets. It will be noted that the lower edges of the vertical walls 7 and 8' are on a common horizontal plane. The channels have out-turned brackets 9 at their ends which are provided with pins or rivets 10 to move in slots 11 in the hopper end walls to guide the movement of the channels.

Movement of the channels is controlled by means of a vertical bar 12 which is provided with notches 13 along one side to cooperate with the end of a slot 14 in angle bracket 15 attached to the side of the hopper. Slot 14 is slightly longer than the width of bar 12 so that the bar may be moved laterally to bring the notches into and out of engagement with the end of the slot. Two drag links 16 are pivotally connected to the top of bar 12, and the opposite ends of the links are pivotally connected to the respective channels 8. Thus vertical movement of the bar will cause horizontal movement of the walls 8' to vary the width of the hopper outlets. When the outlets are adjusted to desired size, the bar is moved laterally to slip the notches in the plane of the slot over the end of the slot to lock the assembly in position.

The movable walls 8' which form the sides of the hopper outlets have inclined extensions 17 which nest and are hinged together as at 18, along the center line of the hopper. The channels and the extensions 17 are entirely within the protective spread of the separator or baffle 6. This will prevent the weight of the feed within the hopper from resting upon the adjustable channels and extensions to prevent their free movement.

Flow of feed through the hopper outlets is controlled by pivoted closure plates 19. These plates are considerably wider than the outlets, and each has an upstanding pivot member 20 which is hook-like and located intermediate the edges of the plate and adapted to engage the free flange of a channel member 8. The pivot member 20 hooks over the top edge of the flange to mount the plate so that the plate has free rocking motion. The weight of the feed in the hopper upon the end of the plate underlying the outlet will rock the plate downward uncovering the outlet, and permitting the feed to flow from the hopper.

To control the movement of the closure plates, and permit them to open only when feed is needed to replenish the supply in the feed troughs, means are provided to impose the weight of the troughs to the closure plates. The two feed troughs 21, as shown, are formed from separate sheet metal blanks, each trough being formed at one end of its blank, and the sheets continuing upward from the back walls of the troughs to provide inclined aprons 22, vertical portions 23, and horizontal flanges 24. These members, when bent to form, are placed back to back with the vertical portions 23 in contact with one another and rivets or other fastening means permanently join the two members to form a rigid trough assembly. The oppositely disposed horizontal flanges 24 rest upon the flanged inner ends 25 of the closure plates which projects beyond the pivot member 20 to form operating arms for the plates so that the weight of the trough assembly will urge the closure plates to outlet-closing position. To counterbalance the weight of the trough assembly, so that the weight of the feed in the hopper will cause the closure plate to open, the trough assembly is suspended from the hinge 18 at the apex of the extensions 17 by means of a coiled spring 26. When the troughs are empty, that portion of the weight of the trough assembly carried upon the operating arms of the closure plates will be insufficient to hold the plates in closed position against the pressure of the feed upon their outer ends. Consequently, the plates will move to open position and feed will flow from the hopper outlets into the trough. As the troughs become filled, the added weight of the trough assembly becomes sufficient to extend the spring 26 and force the closure plates to closed position, cutting off the flow of feed.

By reason of the above structure the flow of feed to the troughs is completely controlled by the amount of feed within the trough. The arrangement prevents overflowing, and consequent waste of the feed due to the fowl perching upon, or in other ways knocking against or putting their weight on the trough. Such an arrangement insures the trough being kept filled at all times.

In order to prevent the feed from caking or clogging in the hopper, means are provided to loosen or agitate it. For this purpose two shafts 27 extend the full length of the hopper with their ends journalled in the hopper end walls. One of the shafts 27 is located near the bottom edge of each leg of the separator 6. Curved fingers 28 are rigidly secured at spaced intervals along the shafts, the fingers curving beneath the edges of the separator and into the throats of the twin outlets of the hopper. The shafts project through the end walls of the hopper, and each end of each shaft has a lever 29 fixed to it, with the two levers at each end of the hopper converging toward one another and normally held in this position by means of a spring 30 extending between the levers. The lower end of each lever is connected pivotally to a link 31 which has its opposite end pivotally connected to a platform 32 which entirely surrounds the feeder near its base. The platform has no attachment to the feeder except through the links 31 and levers 29 and the platform, therefore, is suspended from the levers.

When the chickens, or other fowl, approach the feeder they will step upon the platform 32 in order to reach the feed troughs. The weight of the fowl will be sufficient to overcome the springs 30 and straighten the link and lever connections, thus causing the shafts 29 to rock and the fingers to swing up into the feed to loosen it. When the fowl steps down from the platform, a reverse movement of the parts will take place, again agitating the feed. This will keep the feed loose so that it will be free-flowing when the troughs are light enough to rise and permit the hopper closure plates to open.

While in the above one practical embodiment of the invention has been disclosed, it will be understood that the specific structure described and shown is by way of example only, and the invention may take other forms within the scope of the appended claims.

What is claimed is:

1. In a feeder, a hopper having a pair of outlets, a plate pivoted intermediate its ends adjacent each outlet, one end of each of said plates forming a closure for its outlet and the other ends of said plates projecting toward one another and forming operating arms for said plates, a pair of feed troughs positioned one beneath each hopper outlet, said feed troughs being integrally connected and suspended from the operating arms of said plates to urge said plates to outlet-closing position, and means to counter-balance the empty weight of said troughs.

2. In a feeder as claimed in claim 1, one side of each outlet being movable to adjust the size of said outlet, and the plates being pivoted to said movable sides of the outlets.

3. In a feeder as claimed in claim 1, one side of each outlet being movable to adjust the size of said outlet, the said plates being pivoted to said movable sides of the outlets, and means to lock the movable sides in positions of adjustment.

4. In a feeder, a hopper having an elongated outlet extending the length thereof, said outlet having parallel vertical walls terminating in a common horizontal plane at the bottom, said hopper having a wall connected to the top of a wall of the outlet and inclined upwardly and outwardly therefrom, a baffle above the top of the other wall of said outlet and oppositely inclined to said inclined hopper wall, said baffle lying across the major portion of the width of said outlet to support the weight of feed in the hopper above said outlet, a closure valve for said outlet in the form of a flat plate bridging the bottom of said outlet and projecting therebeyond, a feed trough below said outlet freely movable in a vertical direction and suspended from the projecting end of said flat plate, means to pivot said flat plate along an axis parallel to said outlet intermediate the point of suspension of said feed trough and said outlet, and means to counterbalance the weight of said feed trough.

5. In a feeder, a hopper having a pair of spaced elongated outlets extending the length thereof, said outlets each having parallel vertical walls terminating in a common horizontal plane at the bottom, said hopper having walls connected to the tops of the outside walls of the outlets and diverging upwardly from one another, an inverted V-shaped baffle overlying and bridging the space between said outlets and projecting over the major portions of said outlets to support the weight of feed in said hopper above said outlets, a closure valve for each outlet in the form of a flat plate bridging the bottom of its respective outlet and projecting beyond said outlet toward the opposite outlet, a pair of feed troughs beneath said outlets, freely movable in a vertical direction and suspended from the projecting ends of said flat plates, means to pivotally mount said flat plates along axes parallel to said outlets and intermediate the points of suspension of said feed troughs and said outlets, and means to counterbalance the weight of said feed troughs.

6. In a feeder as claimed in claim 4, said outlet wall beneath said baffle being adjustable toward and from the other wall of said outlet to change the width of the outlet opening.

7. In a feeder as claimed in claim 5, the inner adjacent walls of said outlets being adjustable toward and from the outside walls of the outlets to change the widths of said outlet openings.

8. In a feeder, a hopper having an elongated outlet extending the length thereof, said outlet having parallel vertical walls terminating in a common horizontal plane at the bottom, said hopper having a wall connected to the top of a wall of the outlet and inclined upwardly and outwardly therefrom, a baffle above the top of the other wall of said outlet and oppositely inclined to said inclined hopper wall, said baffle lying across the major portion of the width of said outlet to support the weight of feed in the hopper above said outlet, a closure valve for said outlet in the form of a flat plate bridging the bottom of said outlet and projecting therebeyond, a feed trough below said outlet freely movable in a vertical direction and having an upwardly extending portion turned outwardly at its upper end to form a horizontal flange to overlie and contact the projecting end of said flat plate, means to pivot said flat plate along an axis parallel to said outlet intermediate the line of contact of said horizontal flange and said outlet, and means to counterbalance the weight of said feed trough.

References Cited in the file of this patent

UNITED STATES PATENTS

| | | |
|---|---|---|
| 1,530,101 | Ashing | Mar. 17, 1925 |
| 1,812,166 | Palmer | June 30, 1931 |
| 1,815,679 | Ruth | July 21, 1931 |
| 1,849,908 | Clutter | Mar. 15, 1932 |
| 2,475,070 | Wood | July 5, 1949 |
| 2,485,173 | Smucker | Oct. 18, 1949 |